United States Patent [19]
Kato

[11] Patent Number: 6,094,286
[45] Date of Patent: *Jul. 25, 2000

[54] SCANNING OPTICAL APPARATUS

[75] Inventor: Manabu Kato, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/918,129

[22] Filed: Aug. 27, 1997

[30] Foreign Application Priority Data

Aug. 28, 1996 [JP] Japan ................................. 8-245779

[51] Int. Cl.$^7$ ................................................. G02B 26/08
[52] U.S. Cl. ......................... 359/206; 359/207; 359/570; 359/566; 347/258
[58] Field of Search ..................................... 359/196, 205, 359/206, 207, 566, 570; 347/256, 258

[56] References Cited

U.S. PATENT DOCUMENTS

| | | |
|---|---|---|
| 5,208,701 | 5/1993 | Maeda ..................................... 359/574 |
| 5,212,501 | 5/1993 | Nakamura et al. . |
| 5,410,563 | 4/1995 | Nakamura et al. ....................... 372/95 |
| 5,486,694 | 1/1996 | Harris ....................................... 250/236 |
| 5,838,480 | 11/1998 | McIntyre et al. ........................ 359/205 |

FOREIGN PATENT DOCUMENTS

| | | |
|---|---|---|
| 3-125111 | 5/1991 | Japan . |
| 5-60997 | 3/1993 | Japan . |
| 6-324280 | 11/1994 | Japan . |

*Primary Examiner*—Darren E. Schuberg
*Attorney, Agent, or Firm*—Fitzpatrick, Cella, Harper & Scinto

[57] ABSTRACT

A scanning optical apparatus includes a semiconductor laser as a light source, a deflector for deflecting a light beam emitted from the semiconductor laser, and optical element for directing the light beam emitted from the semiconductor laser to a surface to be scanned. The optical element includes a refracting porion and a diffracting portion, wherein changes in the focus in the main scanning direction, resulting from the environmental fluctuations, of the scanning optical apparatus are corrected by a characteristic of the optical element.

39 Claims, 12 Drawing Sheets

SCANNING OPTICAL APPARATUS

BACKGROUND OF THE INVENTION

1. Field of the Invention

This invention relates to a scanning optical apparatus, and particularly to a scanning optical apparatus suitable for use in an apparatus, such as a laser beam printer (LBP), having an electrophotographic process or a digital copying apparatus designed to deflect a light beam emitted from light source means, comprising a semiconductor laser, by a deflecting element, and optically scan a surface to be scanned through a scanning optical element (an imaging element) having the fθ characteristic to thereby record image information.

2. Related Background Art

In a scanning optical apparatus used in a laser beam printer, a digital copying apparatus or the like, a light beam optically modulated and emitted from light source means in conformity with an image signal is periodically deflected by a light deflector comprising, for example, a rotatable polygon mirror, and is converged into a spot-like shape on the surface of a photosensitive recording medium (a photosensitive drum) by a scanning optical element (an imaging element) having the fθ characteristic, and the surface is optically scanned to thereby effect image recording.

In recent years, it has become more desirable for scanning optical apparatus used in such a laser beam printer (LBP) or the like, to maintain their accuracy during fluctuations in the environment and be suitable for highly minute printing with the reduction in price and compactness of the LBP.

FIG. 1 of the accompanying drawings is a schematic view of the essential portions of a scanning optical apparatus of this kind according to the prior art.

In FIG. 1, a divergent light beam emitted from light source means 21 is substantially collimated by a collimator lens 22, and this light beam (the quantity of light) is limited by a stop 23 and enters a cylindrical lens 24 having predetermined refractive power only in a sub-scanning direction. In the main scanning cross-section of the parallel light beam which has entered the cylindrical lens 24, the light beam emerges therefrom intactly as a parallel light beam. Also, in the sub-scanning cross-section, the light beam converges and is formed as a substantially linear image on the deflecting surface (reflecting surface) 25a of a light deflector 25 comprising a rotatable polygon mirror. Here, the term main scanning cross-section refers to a light beam cross-section formed with time by a light beam deflected and reflected by the deflecting surface of the light deflector. Also, the term sub-scanning cross-section refers to a cross-section containing the optical axis of an fθ lens and which is orthogonal to the main scanning cross-section.

The light beam deflected by the deflecting surface 25a of the light deflector 25 is directed to a photosensitive drum surface 28 as a surface to be scanned through a scanning optical element (fθ lens) 26 having the fθ characteristic, and the light deflector is rotated in the direction of arrow A, whereby the photosensitive drum surface 28 is optically scanned in the direction of arrow B. Image recording is thereby effected on the photosensitive drum surface 28, which is a recording medium.

In recent years, as regards the scanning optical element (fθ lens) in the scanning optical apparatus of this kind, one using a plastic lens formed of a plastic material has become mainstream from the requirements for a low price and compactness. However, the refractive index of a plastic lens varies with fluctuation (temperature fluctuation) of in its use environment and therefore, in a scanning optical apparatus using an fθ lens comprising a plastic lens, changes in the magnification in the main scanning direction and changes in focus due to the fluctuation of the environment are caused.

FIG. 2 of the accompanying drawings is a cross-sectional view (main scanning cross-sectional view) of the essential portions of a comparative example of the scanning optical apparatus in the main scanning direction thereof for illustrating such a problem, and Table 1 below shows the optical arrangement and the aspherical coefficient of the fθ lens in the comparative example. FIG. 3 of the accompanying drawings is an illustration showing the curvature of the image field, the aberration of distortion and image height deviation in the main scanning direction of this scanning optical apparatus, and the solid lines indicate the characteristics at room temperature (25° C.), and the dotted lines indicate the characteristics when a temperature rise of 50° C. arose. In FIG. 2, the same elements as those shown in FIG. 1 are given the same reference characters.

TABLE 1

Design Example of Scanning Optical Apparatus

| | | | | surface shape of fθ lens | |
|---|---|---|---|---|---|
| | | | | first surface | second surface |
| wavelength used | λ(nm) | 780 | R | 5.35941e + 01 | 2.04585e + 02 |
| refraction index of fθ lens | n | 1.525 | Ks | −1.85041e + 01 | −3.19655e + 02 |
| incident angle in polygon | θi | −90.0 | B4s | −4.01467e + 06 | −5.67674e − 06 |
| max. emergence angle in polygon | θmax | 45.0 | B6s | 1.97617e − 10 | 1.13298e − 09 |
| distance between polygon and fθ lens | e | 21.3 | B8s | 3.18251e − 13 | −1.08244e − 12 |
| center thickness of fθ lens | d | 8.0 | B10s | −4.34340e − 17 | 3.75204e − 17 |
| distance between fθ lens and scanned surface | Sk | 128.2 | Ke | −1.85041e + 01 | −3.19655e + 02 |
| fθ coefficient | f | 136.0 | B4e | −6.38051e − 06 | −7.32456e − 06 |
| polygon | | φ20, 4 surfaces | B6e | −5.04862e − 10 | 4.21805e − 10 |
| In the shape of fθ lens, | | | B8e | 2.89411e − 13 | −1.75629e − 12 |
| suffix s indicates laser side, | | | B10e | 1.05151e − 15 | 5.30015e − 17 |

TABLE 1-continued

Design Example of Scanning Optical Apparatus

| and | | BOE Phase term | |
| --- | --- | --- | --- |
| suffix e indicates a side opposite to laser side. | | first surface | second surface |
| | C2 | — | — |
| | C4 | — | — |
| | C6 | — | — |
| | C8 | — | — |

As can be seen from FIG. 3, when an fθ lens comprising a plastic lens is used, the focus and magnification in the main scanning direction are changed greatly by a temperature rise, and particularly in a scanning optical apparatus for effecting highly minute printing, the changes in the focus and magnification due to this environmental fluctuation (temperature fluctuation) pose a problem.

Also, from U.S. Pat. No. 5,486,694, there is known a scanning optical apparatus in which a light beam emitted from light source means is deflected by a deflecting element, and the deflected light beam is imaged on a surface to be scanned through a scanning optical element having a refracting portion and a diffracting portion to thereby scan the surface to be scanned.

In the scanning optical element disclosed in this U.S. Pat. No. 5,486,694, however, no consideration is paid to the environmental fluctuations.

SUMMARY OF THE INVENTION

It is an object of the present invention to provide a scanning optical apparatus for correcting changes in focus in the main scanning direction resulting from the environmental fluctuations of the scanning optical apparatus by the characteristic of optical means having a refracting portion and a diffracting portion, resists environmental fluctuations (temperature fluctuation and the wavelength fluctuation of a semiconductor laser which is light source means) and moreover is suitable for highly minute printing and is compact.

It is also an object of the present invention to provide a scanning optical apparatus for correcting changes in focus and changes in magnification in the main scanning direction resulting from the environmental fluctuations of the scanning optical apparatus by the characteristic of a scanning optical element having a refracting portion and a diffracting portion, which resists environmental fluctuations (temperature fluctuation and the wavelength fluctuation of a semiconductor laser which is light source means) and moreover is suitable for highly minute printing and is compact.

The scanning optical apparatus of the present invention comprises:

light source means comprising a semiconductor laser;

a deflecting element for deflecting a light beam emitted from the light source means; and optical means having a refracting portion and a diffracting portion and for directing the light beam emitted from the light source means onto a surface to be scanned;

characterized in that changes in the focus in the main scanning direction resulting from the environmental fluctuations of the scanning optical apparatus are corrected by the a characteristic of the optical means.

Particularly, the scanning optical apparatus is characterized in that the environmental fluctuations are a temperature fluctuation and a wavelength fluctuation of the semiconductor laser, and the characteristic is the power ratio between the refracting portion and diffracting portion of the optical means.

Also, the scanning optical apparatus is characterized in that when the optical means is a scanning optical element for directing the light beam deflected by the deflecting element onto the surface to be scanned, changes in magnification and changes in focus in the main scanning direction resulting from environmental fluctuations of the scanning optical apparatus are corrected by the characteristic of the scanning optical element.

Particularly, the scanning optical apparatus is characterized in that when the powers of the refractive portion and the diffracting portion of the scanning optical element are φL and φD, respectively, the condition that $$1.0 \leq \phi L/\phi D \leq 2.6$$

is satisfied, the refracting portion comprises a single lens, the diffracting portion comprises a diffracting optical element, the diffracting optical element is added to at least one of the both lens surfaces of the single lens, the material of the single lens is a plastic material, both lens surfaces of the single lens in the main scanning direction comprise an aspherical shape, the single lens differs in refractive power between the main scanning direction and the sub-scanning direction, the diffracting optical element is a binary optical element comprising a staircase-like diffraction grating, or the diffracting optical element is a Fresnel-like optical element comprising a sawtooth-like diffraction grating, and the power ratio between the refracting portion and the diffracting portion of the scanning optical element satisfies the condition within the range from the on-axis to the off-axis.

Also, the scanning optical apparatus is characterized in that the optical means is an anamorphic optical element having a diffracting portion and for imaging the light beam emitted from the light source means into a linear shape long in the main scanning direction on the deflecting surface of the deflecting element, and a scanning optical element having a refracting portion for directing the light beam deflected by the deflecting element onto the surface to be scanned, and changes in focus in the main scanning direction resulting from the environmental fluctuations of the scanning optical apparatus are corrected by the characteristic of the anamorphic optical element and the scanning optical element.

Particularly, the scanning optical apparatus is characterized in that the characteristic is the power ratio between the diffracting portion of the anamorphic optical element and the refracting portion of the scanning optical element, the anamorphic optical element comprises a cylindrical lens, the diffracting porion comprises a diffracting optical element, the diffracting optical element is added to at least one of the both lens surfaces of the cylindrical lens, the scanning optical element is a single lens, the material of the single lens is a plastic material, the both lens surfaces of the single lens in the main scanning direction comprise an aspherical shape, the single lens differs in refractive power between the main scanning direction and the sub-scanning direction, the diffracting optical element is a binary optical element comprising a staircase-like diffraction grating, or the diffracting optical element is a Fresnel-like optical element comprising a sawtooth-like diffraction grating.

Also, the scanning optical apparatus is characterized in that the optical means is a converting optical element having a diffracting portion and converts the light beam emitted from the light source means into a substantially parallel light beam, and a scanning optical element having a refracting portion for directing the light beam deflected by the deflecting element onto the surface to be scanned, and changes in the focus in the main scanning direction resulting from the environmental fluctuations of the scanning optical apparatus are corrected by the characteristic of the converting optical element and the scanning optical element.

Particularly, the scanning optical apparatus is characterized in that the characteristic is the power ratio between the diffracting portion of the converting optical element and the refracting portion of the scanning optical element, the converting optical element comprises a collimator lens having positive refractive power, the diffracting portion comprises a diffracting optical element, the diffracting optical element is added to at least one of the both lens surfaces of the collimator lens, the scanning optical element is a single lens, the material of the single lens is a plastic material, the both lens surfaces of the single lens in the main scanning direction comprise an aspherical shape, the single lens differs in refractive power between the main scanning direction and the sub-scanning direction, the diffracting optical element is a binary optical element comprising a staircase-like diffraction grating, or the diffracting optical element is a Fresnel-like optical element comprising a sawtooth-like diffraction grating.

DESCRIPTION OF THE PREFERRED EMBODIMENTS

Figure 1:
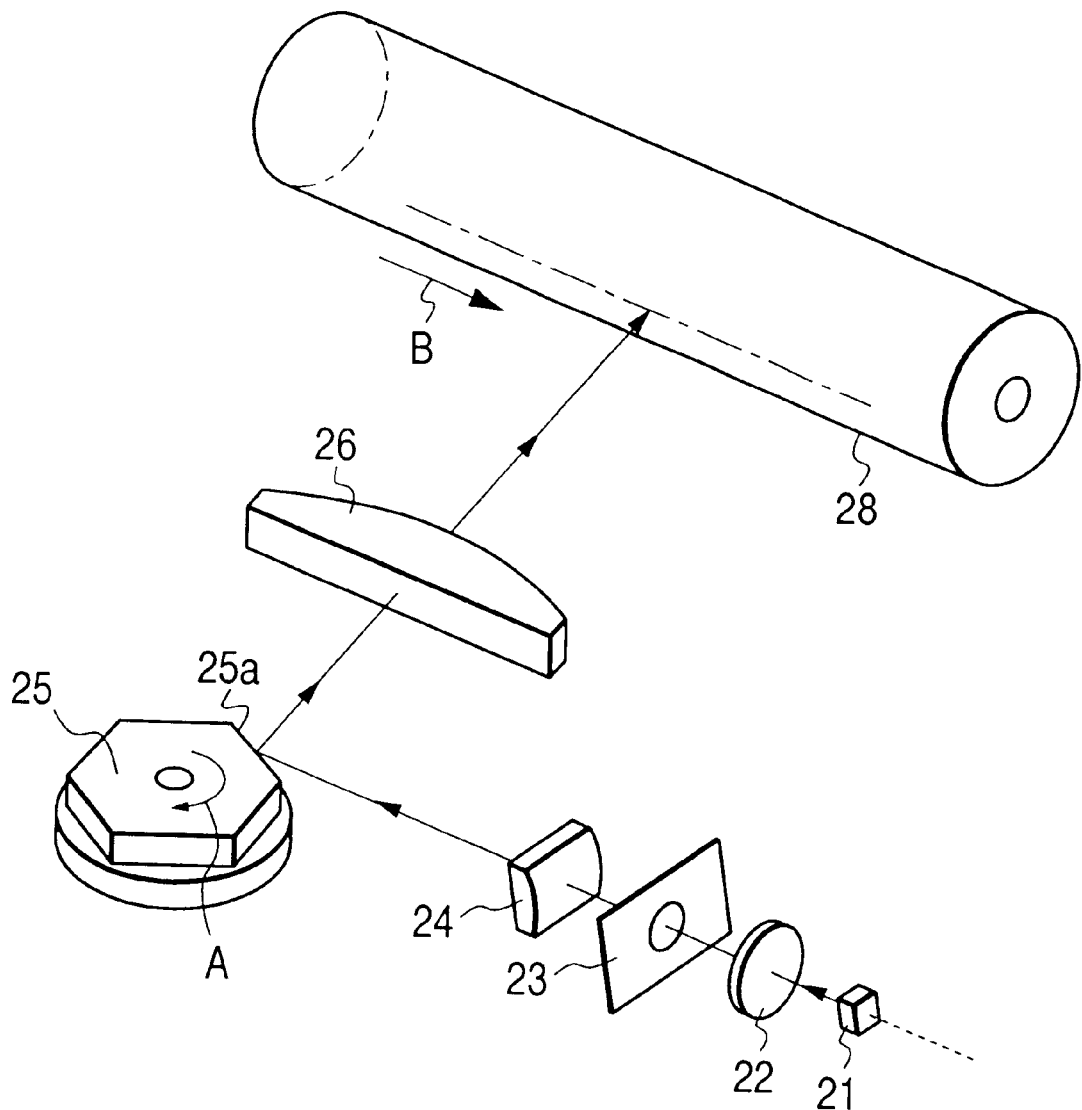
FIG. 1 is a schematic view of the essential portions of a scanning optical apparatus according to the prior art.
Figure 2:
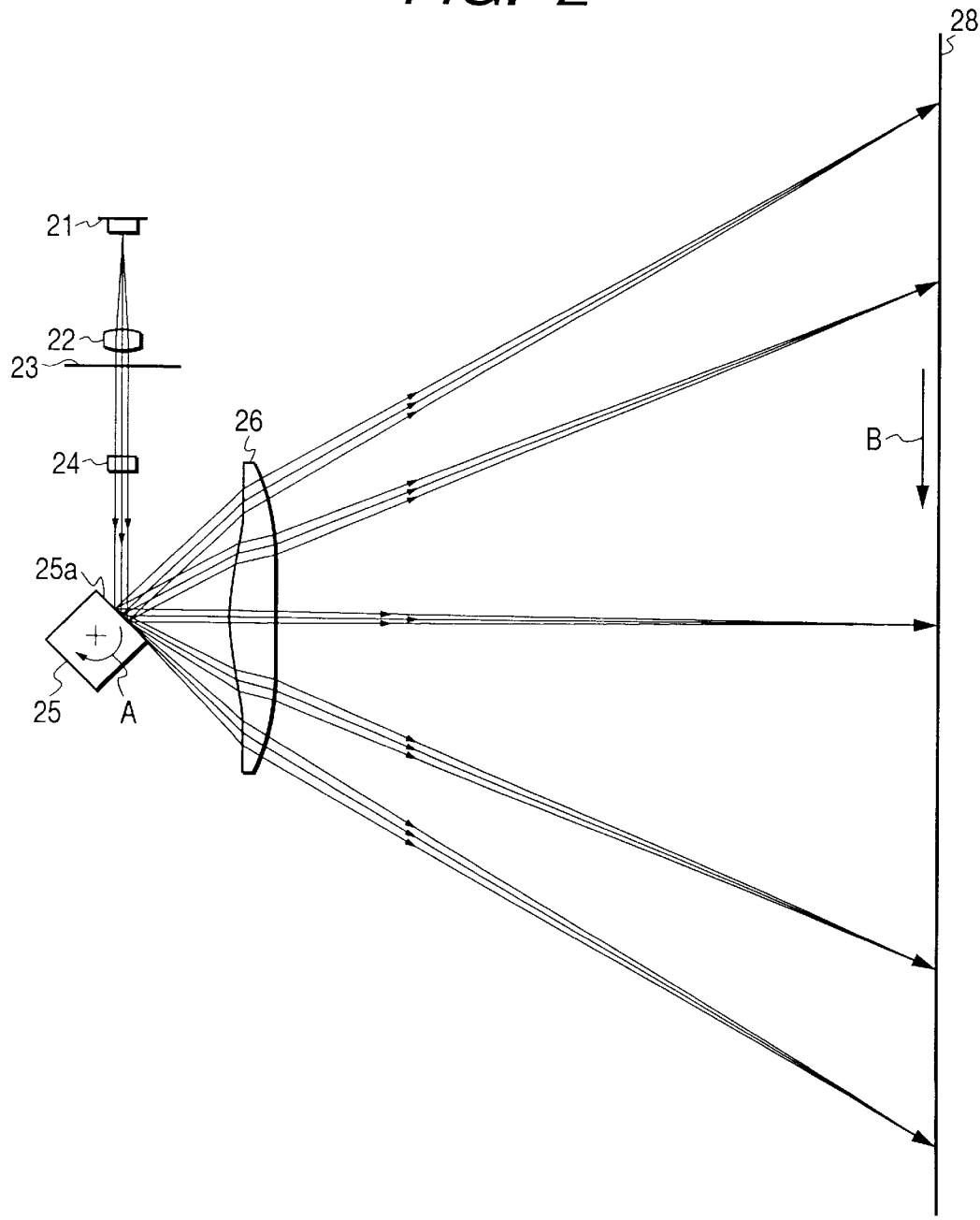
FIG. 2 is a cross-sectional view of the essential portions of the scanning optical apparatus according to the prior art in the main scanning direction.
Figure 3:
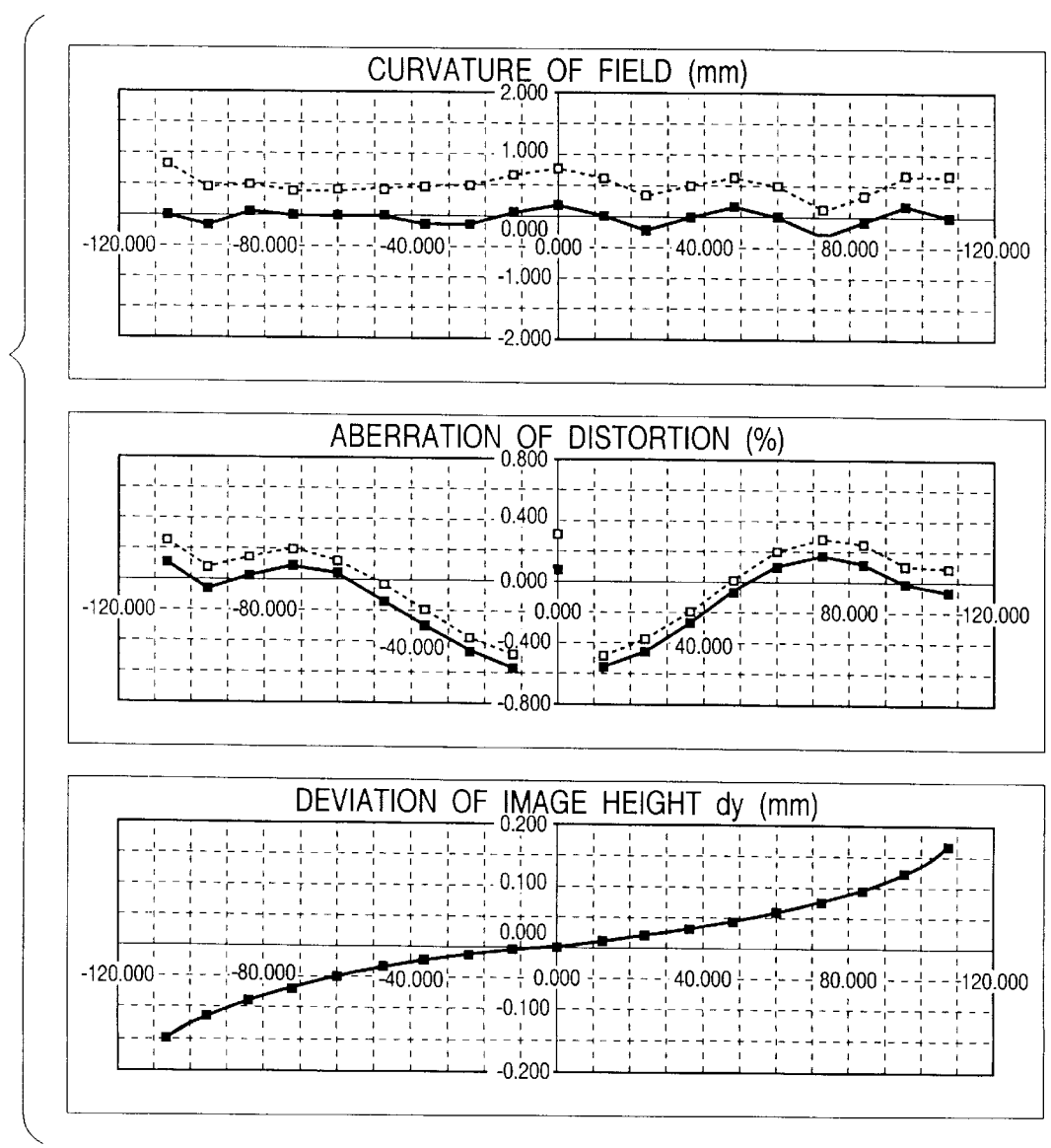
FIG. 3 shows the curvature of the image field, the aberration of distortion, and image height deviation in the main scanning direction before and a after temperature rise in the scanning optical apparatus according to the prior art.
Figure 4:
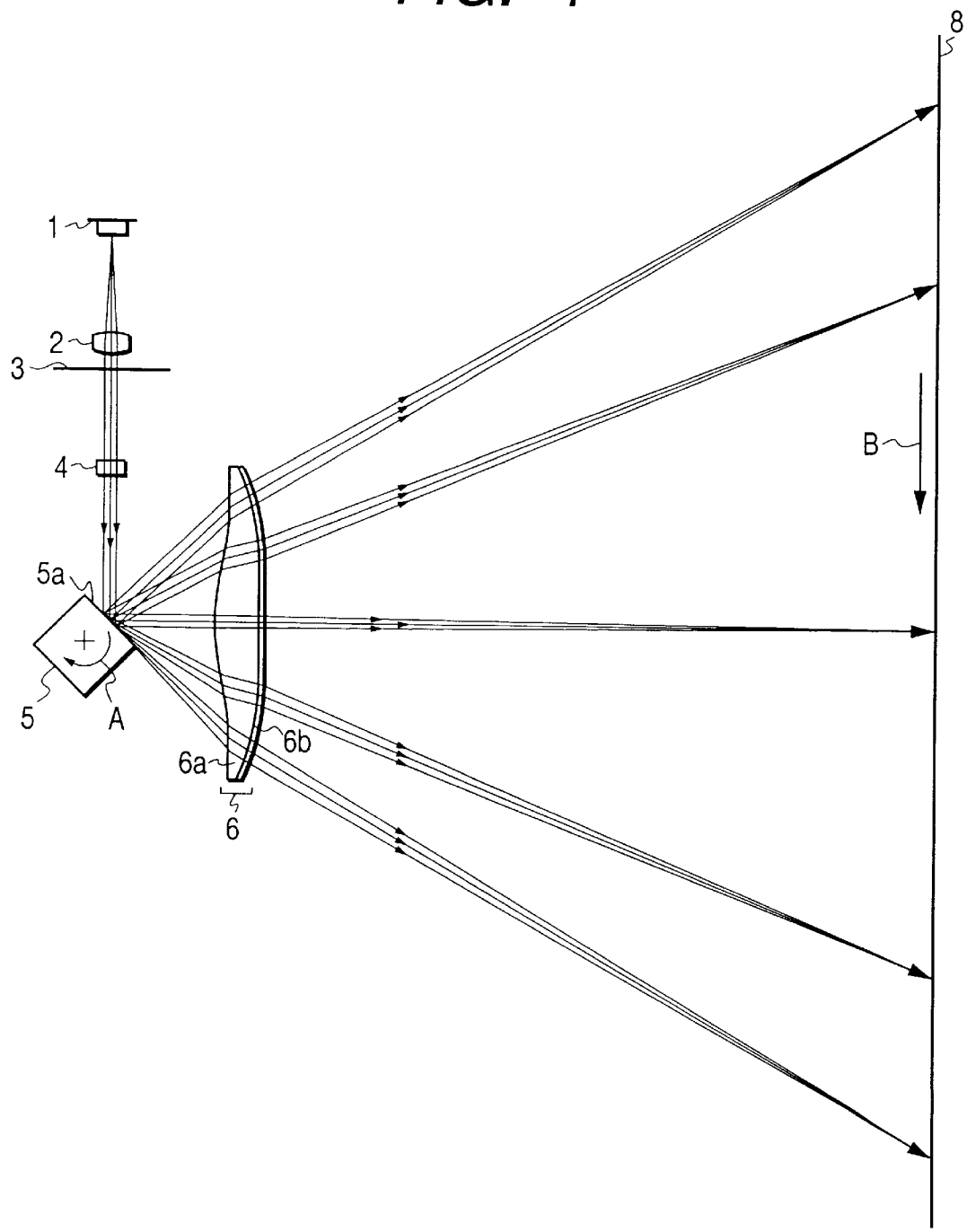
FIG. 4 is a cross-sectional view of the essential portions of Embodiment 1 of the present invention is the main scanning direction.

FIG. 4 is a cross-sectional view (main scanning cross-sectional view) of the essential portions of a scanning optical apparatus according to Embodiment 1 of the present invention for use in a laser beam printer in the main scanning direction.

In FIG. 4, reference numeral 1 designates light source means comprising, for example, a semiconductor laser. Reference numeral 2 denotes a collimator lens which converts a divergent light beam emitted from the light source means 1 into a parallel light beam. Reference numeral 3 designates an aperture stop which limits the passing light beam (the quantity of light). Reference numeral 4 denotes a cylindrical lens (cylinder lens) which has predetermined refractive power only in a sub-scanning direction perpendicular to the plane of the drawing sheet of FIG. 4, and which images the light beam passed through the aperture stop 3 as a substantially linear image in a sub-scanning cross-section on the deflecting surface 5a of a light deflector 5 to be described below.

Reference numeral 5 denotes a light deflector comprising, for example, a polygon mirror (rotatable polygon mirror) as a deflecting element, which is rotated at a predetermined speed in the direction of arrow A by driving means (not shown) such as a motor.

Reference numeral 6 designates a scanning optical element having the fθ characteristic and having a refracting portion 6a and a diffracting portion 6b. The refracting porion 6a comprises a single lens (fθ lens) formed of a plastic material, and both lens surfaces of the single lens 6a in the main scanning direction comprise an aspherical shape. Also, the single lens 6a differs in refractive power between the main scanning direction and the sub-scanning direction. The diffracting portion 6b comprises a diffracting optical element, and comprises, for example, a binary diffracting optical element comprising a staircase-like diffraction grating produced by photoetching, or a Fresnel-like diffracting optical element comprising a sawtooth-like diffraction grating produced by surface cutting. In the present embodiment, the diffracting optical element 6b is added to at least one (the surface to be scanned side) of both lens surfaces of the single lens 6a, and the design is made such that the power (refractive power) ratio between the refracting portion 6a and the diffracting portion 6b is all within the range of expression (1), which will be described later from the on-axis toward the off-axis. The scanning optical element 6 causes a light beam, based on image information deflected by the light deflector 5, to be imaged on a photosensitive drum surface 8 which is a recording medium and a surface to be scanned, and corrects the surface inclination of the deflecting surface of the light deflector 5.

In the present embodiment, a divergent light beam emitted from the semiconductor laser 1 is converted into a substantially parallel light beam by the collimator lens 2, and this light beam (the quantity of light) is limited by the aperture stop 3 and enters the cylindrical lens 4. The light beam which has entered the cylindrical lens 4 intactly emerges therefrom in the main scanning cross-section. Also, in the sub-scanning cross-section, the light beam converges and is imaged as a substantially linear image (a linear image long in the main scanning direction) on the deflecting surface 5a of the light deflector 5. The light beam deflected by the deflecting surface 5a of the light deflector 5 is then directed onto the photosensitive drum surface 8 through the scanning optical element 6, and this light deflector 5 is rotated in the direction of arrow A to thereby optically scan the photosensitive drum surface 8 in the direction of arrow B. Thereby, image recording is effected on the photosensitive drum surface 8, which is a recording medium.

The shapes of the single lens (fθ lens) 6a constituting the scanning optical element 6 in the present embodiment and the diffracting optical element 6b added to that lens surface of the single lens 6a, which is located at a side of the surface 8 to be scanned, are as follows:

(1) single lens . . . an aspherical shape in which the main scanning direction can be represented by a function x up to 10th order.

When the point of intersection between the single lens 6a and the optical axis is defined as the origin, and the direction of the optical axis is defined as the x-axis, the axis orthogonal to the optical axis in the main scanning plane is defined as the y-axis, and the axis orthogonal to the optical axis in the sub-scanning plane is defined as the z-axis, $$x = \frac{Y^2/R}{1+(1-(1+K)(Y/R)^2)^{1/2}} + B_4 Y^4 + B_6 Y^6 + B_8 Y^8 + B_{10} Y^{10}$$

(where R is the radius of curvature, and K, $B_4$, $B_6$, $B_8$ and $B_{10}$ are aspherical surface coefficients)

(2) diffracting optical element . . . a diffracting surface in which the main scanning direction is represented by a phase function w up to the 8th order is represented by the following expression:

$$w = C_2 Y^2 + C_4 Y^4 + C_6 Y^6 + C_8 Y^8$$

Consider here a case where the temperature of the scanning optical apparatus has risen, e.g., by dt. By this temperature rise, the refractive index n of the refracting portion 6a of the scanning optical element is changed by dn/dt, and a change $d\phi_I$ in power (refractive power) resulting therefrom is:

$$d\phi_I = \phi_L/(n-1) \times dn/dt,$$

where n is the refractive index of the refracting portion 6a, $\phi_L$ is the power of the refracting portion 6a.

On the other hand, by the temperature rise, the oscillation wavelength λ of the semiconductor laser 1 is also changed by dλ/dt, and changes $d\phi_L$ and $d\phi_D$ in the power (refractive power) of the refracting portion 6a and the diffracting portion 6b resulting therefrom are:

$$d\phi_L = -\phi_L/(170 \times \nu_L) \times d\lambda/dt,$$

and $$d\phi_D = -\phi_D/(170 \times \nu_D) \times d\lambda/dt,$$

where $\nu_L$ is the Abbe's number of the refracting portion 6a, and $\nu_D$ is the Abbe's number of the diffracting portion 6b, and $\phi_L$ is the power of the refracting portion 6a, and $\phi_D$ is the power of the diffracting portion 6b.

Here, to suppress the changes in magnification and focus in the main scanning direction caused by environmental fluctuations, it is necessary to satisfy the following expression:

$$d\phi_I + d\phi_L + d\phi_D = 0.$$

Also, the Abbe's number $\nu_D$ of the diffracting portion 6b and the amount of change resulting from the temperature rise are defined, for example, as follows:

$$\nu_D = -3.453,$$

$$dn/dt = -1.2E-4/° C.,$$

$$d\lambda/dt = 0.255 \text{ nm}/° C.,$$

$$d\phi_I + d\phi_L + d\phi_D = 0,$$

$$\phi_L/(n-1)dn/dt - (\phi_L/(170\nu_L) + \phi_D/(170\nu_D))d\lambda/dt = 0,$$

$$(1.2E-4/(n-1) + 1.5E-3/\nu_L)\phi_L = 4.34E-4\phi_D.$$

Here, when the values the refractive index and Abbe's number of the refracting portion 6a are taken into consideration, $$1.0 \leq \phi L/\phi D \leq 2.6 \qquad (1)$$

where

φL is the power of the refracting portion 6a,

φD is the power of the diffracting portion 6b, and there can be derived the power ratio between the refracting portion 6a and the diffracting portion 6b of the scanning optical element 6 necessary to correct the changes in magnification and focus in the main scanning direction caused by environmental fluctuations (the fluctuation of temperature and the fluctuation of the wavelength of the semiconductor laser 1).

Conditional expression (1) relates to the ratio between the power of the refracting portion 6a constituting the scanning optical element 6 and the power of the diffracting portion 6b also constituting the scanning optical element 6, and if conditional expression (1) is deviated from, it will become difficult to correct the changes in the magnification and focus in the main scanning direction resulting from the environmental fluctuations of the scanning optical apparatus, and this is not preferable.

Table 2 below shows the optical arrangement in the present embodiment, the aspherical surface coefficient of the fθ lens 6a and the phase term of the diffracting optical element (BOE) 6b.

between the refracting portion 6a and the diffracting portion 6b is set to a suitable value so as to satisfy the above-mentioned conditional expression (1), whereby changes in the magnification and focus in the main scanning direction resulting from the environmental fluctuations of the scanning optical apparatus (temperature fluctuation and the wavelength fluctuation of the semiconductor laser) are corrected by the changes in the power of the refracting portion 6a and the diffracting portion 6b. Thereby, according to the

TABLE 2

Design Example of Scanning Optical Apparatus

| | | | | surface shape of fθ lens | |
|---|---|---|---|---|---|
| | | | | first surface | second surface |
| wavelength used | λ(nm) | 780 | R | 7.93998e + 01 | 2.20976e + 02 |
| refraction index of fθ lens | n | 1.525 | Ks | −1.97428e + 01 | −1.09646e + 02 |
| incident angle in polygon | θi | −90.0 | B4s | −4.04006e − 06 | −4.41224e − 06 |
| max. emergence angle in polygon | θmax | 45.0 | B6s | 1.40143e − 09 | 9.51528e − 10 |
| distance between polygon and fθ lens. | e | 27.3 | B8s | −6.54101e − 13 | −2.67361e − 13 |
| center thickness of fθ lens | d | 7.7 | B10s | 1.56835e − 16 | −5.85889e − 17 |
| distance between fθ lens and scanned surface | Sk | 131.1 | Ke | −1.67052 + 01 | −8.60770e + 01 |
| fθ coefficient | f | 136.0 | B4e | −4.36069e − 06 | −4.44281e − 06 |
| polygon | | φ20, 4 surfaces | B6e | −1.47141e − 09 | 9.34793e − 10 |
| In the shape of fθ lens, | | | B8e | −6.14682e − 13 | −3.84409e − 13 |
| suffix s indicates laser side, | | | B10e | 1.79142e − 16 | 3.57417e − 17 |
| and suffix e indicates a side opposite to laser side. | | | | BOE Phase term (wavelength 780 nm) | |
| | | | | first surface | second surface |
| | | | C2 | — | −1.5778E − 03 |
| | | | C4 | — | 4.1480E − 07 |
| | | | C6 | — | −3.7020E − 10 |
| | | | C8 | — | 5.2146E − 14 |

Embodiment 1

Figure 5:
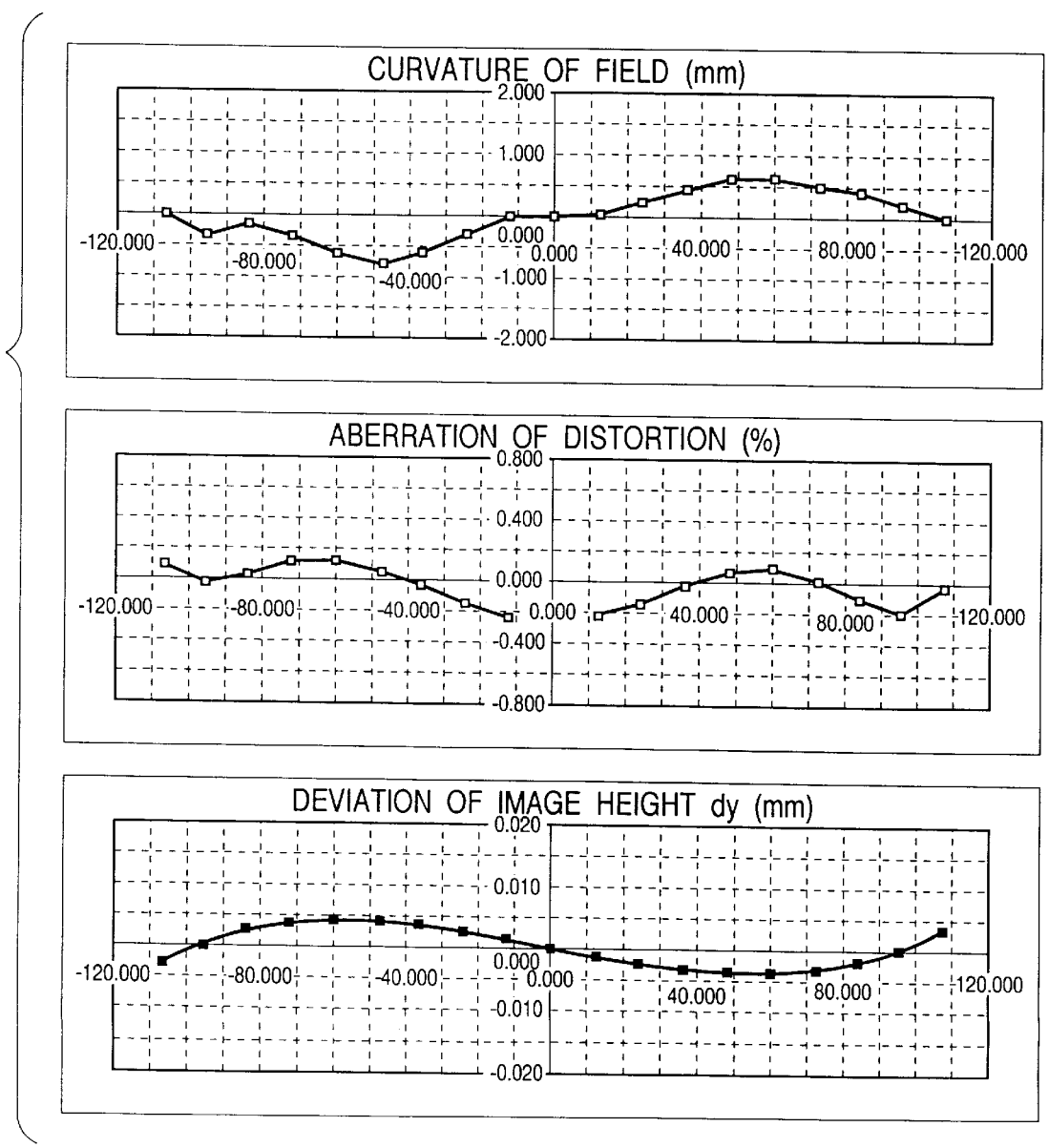
FIG. 5 shows the curvature of image field, aberration of distortion, and image height deviation in the main scanning direction before and after a temperature rise in Embodiment 1 of the present invention.

In this embodiment, the power ratio between the refracting portion 6a and the diffracting portion 6b of the scanning optical element 6 is $$\phi L/\phi D = 1.369,$$

whereby conditional expression (1) is satisfied. FIG. 5 is an illustration showing the curvature of the image field, the aberration of distortion (fθ characteristic), and the image height deviation in the main scanning direction before and after a temperature rise in the present embodiment, and the solid lines indicate the characteristics at room temperature (25° C.) and the dotted lines indicate the characteristics when the temperature has risen by 25° C. and has reached 50° C. It is seen from FIG. 5 that there is little or no change in focus and magnification in the main scanning direction before and after the temperature rise (in FIG. 5, the difference between before and after the temperature rise is minute and therefore the graphs before and after the temperature rise overlap each other).

In the present embodiment, as described above, the scanning optical element 6 is comprised of the refracting portion 6a comprising a lens and the diffracting portion 6b comprising a diffracting optical element, and the power ratio present embodiment, a scanning optical apparatus which resists environmental fluctuations and moreover is suited for highly minute printing is obtained compactly and inexpensively.

Figure 6:
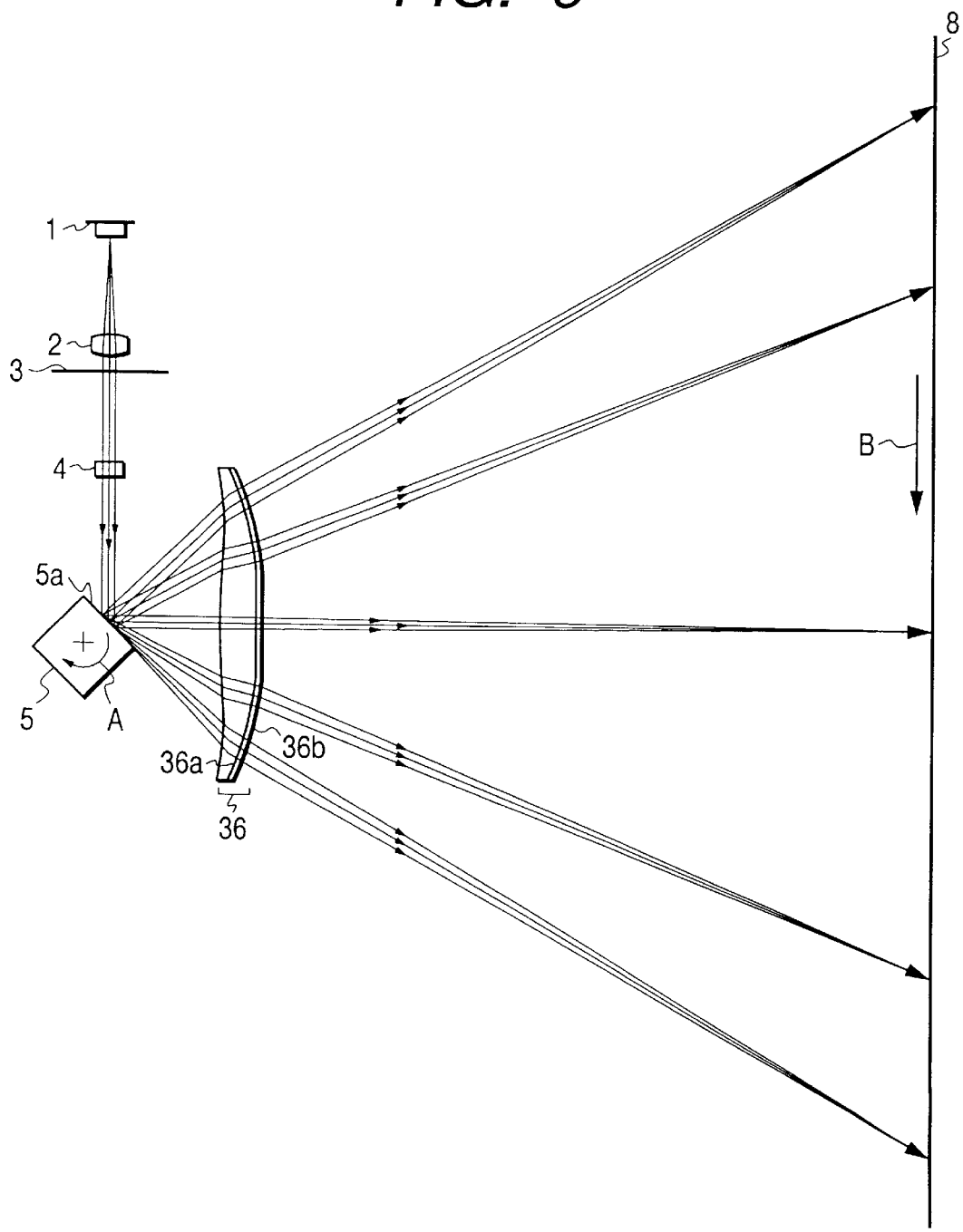
FIG. 6 is a cross-sectional view of the essential portions of Embodiment 2 of the present invention in the main scanning direction.

FIG. 6 is a cross-sectional view (main scanning cross-sectional view) of the essential portions of Embodiment 2 of the present invention in the main scanning direction. In FIG. 6, the same elements as those shown in FIG. 4 are given the same reference numerals.

The difference of this embodiment from the aforedescribed Embodiment 1 is that the material of the refracting portion (fθ lens) 36a of a scanning optical element 36 is a plastic material of high refractive index as compared with that in Embodiment 1, and that corresponding thereto, the power ratio of the refracting portion 36a and the diffracting portion (diffracting optical element) 36b of the scanning optical element 36 is made to differ. In other respects, the construction and optical action of the present embodiment are substantially similar to those of the aforedescribed Embodiment 1, whereby there is obtained a similar effect.

Table 3 below shows the optical arrangement in the present embodiment, the aspherical surface coefficient of the fθ lens 36a and the phase term of the diffracting optical element (BOE) 36b.

TABLE 3

Design Example of Scanning Optical Apparatus

|  |  |  |  | surface shape of fθ lens | |
|---|---|---|---|---|---|
|  |  |  |  | first surface | second surface |
| wavelength used | λ(nm) | 780 | R | 1.07911e + 02 | 3.18395e + 02 |
| refraction index of fθ lens | n | 1.802 | Ks | −2.28102e + 01 | −9.46473e + 01 |
| incident angle in polygon | θi | −90.0 | B4s | −4.66119e − 06 | −4.71285e − 06 |
| max. emergence angle in polygon | θmax | 45.0 | B6s | 1.59106e − 09 | 1.24842e − 09 |
| distance between polygon and fθ lens | e | 27.3 | B8s | −4.98547e − 13 | −3.41971e − 13 |
| center thickness of fθ lens | d | 7.8 | B10s | 1.13098e − 16 | 1.39279e − 17 |
| distance between fθ lens and scanned surface | Sk | 131.3 | Ke | −1.89458e + 01 | −7.85820e + 01 |
| fθ coefficient | f | 136.0 | B4e | −4.90287e − 06 | −4.67721e − 06 |
| polygon |  | φ20, 4 surfaces | B6e | 1.41254e − 09 | 9.61537e − 10 |
| In the shape of fθ lens, |  |  | B8e | −4.39029e − 13 | −2.50060e − 13 |
| suffix s indicates laser side, and |  |  | B10e | 1.10119e − 16 | −2.65806e − 17 |
| suffix e indicates a side opposite to laser side. |  |  |  | BOE Phase term (wavelength 780 nm) | |
|  |  |  |  | first surface | second surface |
|  |  |  | C2 | — | −1.2257E − 03 |
|  |  |  | C4 | — | 4.5423E − 07 |
|  |  |  | C6 | — | −4.5625E − 10 |
|  |  |  | C8 | — | 1.1027E − 13 |

Embodiment 2

Figure 7:
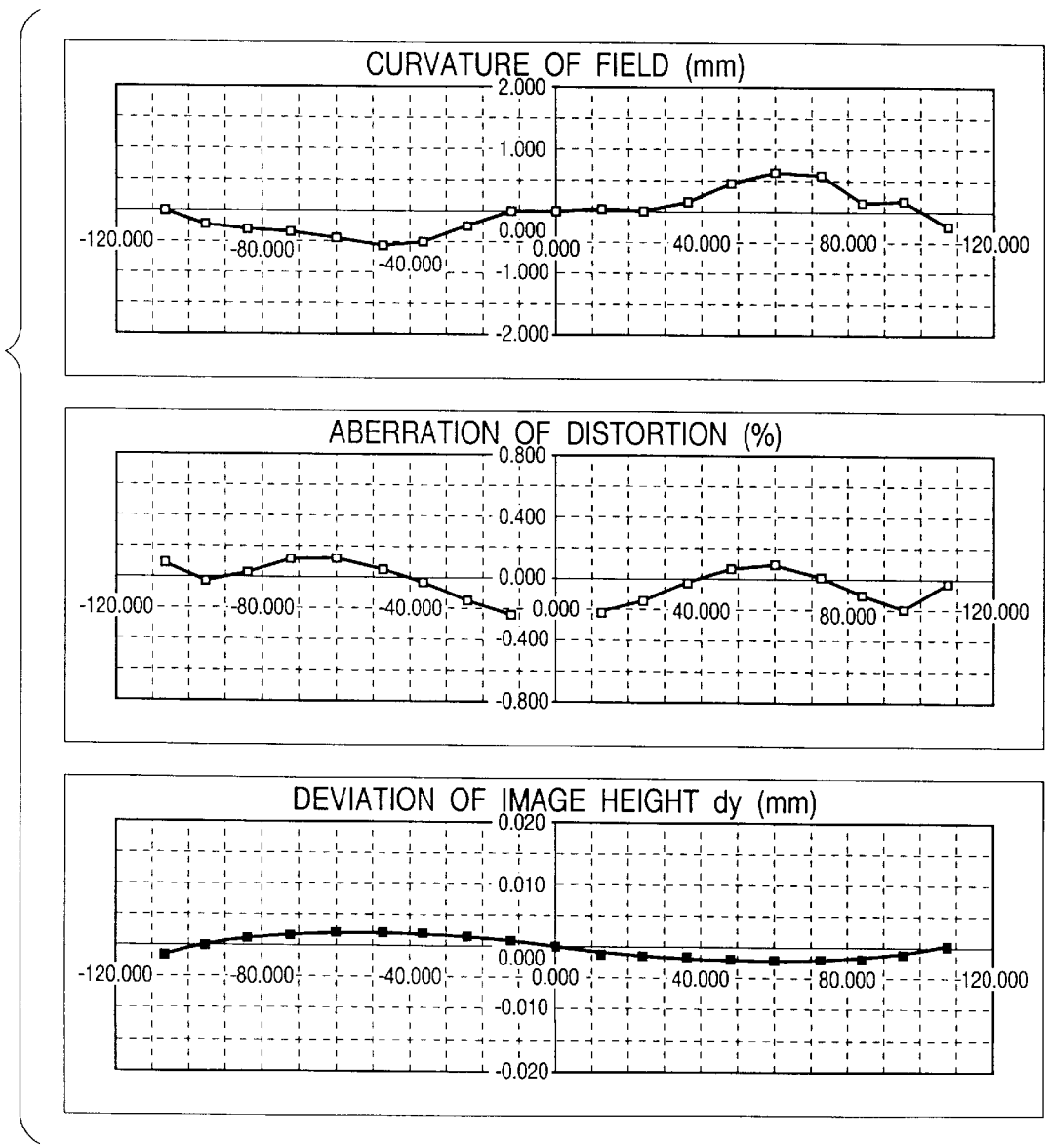
FIG. 7 shows the curvature of the image field, the aberration of distortion, and image height deviation in the main scanning direction before and after a temperature rise in Embodiment 2 of the present invention.

In the present embodiment, the power ratio between the refracting portion 36a and the diffracting portion 36b of the scanning optical element 36 is $$\phi L/\phi D = 2.038$$

to thereby satisfy conditional expression (1). FIG. 7 is an illustration showing the curvature of the image field, the aberration of distortion (fθ characteristic) and image height deviation in the main scanning direction before and after a temperature rise in the present embodiment, and the solid lines indicate the characteristics at room temperature (25° C.) and the dotted lines indicate the characteristics when the temperature has risen by 25° C. and has reached 50° C. It is seen from FIG. 7 that there is little or no change in the focus and magnification in the main scanning direction before and after the temperature rise.

In the present embodiment, even if as described above, the material of the refracting portion (fθ lens) 36a is a material of high refractive index as compared with that in Embodiment 1, the power ratio between the refracting portion 36a and the diffracting portion 36b is set to a suitable value so as to satisfy the aforementioned conditional expression (1), whereby as in Embodiment 1, changes in the magnification and focus in the main scanning direction resulting from the environmental fluctuations (temperature fluctuation and the wavelength fluctuation of the semiconductor laser) of the scanning optical apparatus can be corrected by changes in the power of the refracting portion 36a and the diffracting portion 36b. Also, in the present embodiment, the refracting portion (fθ lens) 36a is constructed by the use of a material of high refractive index and therefore, the center thickness of the refracting portion 36a can be made small, whereby a further reduction in price can be achieved.

Figure 8:
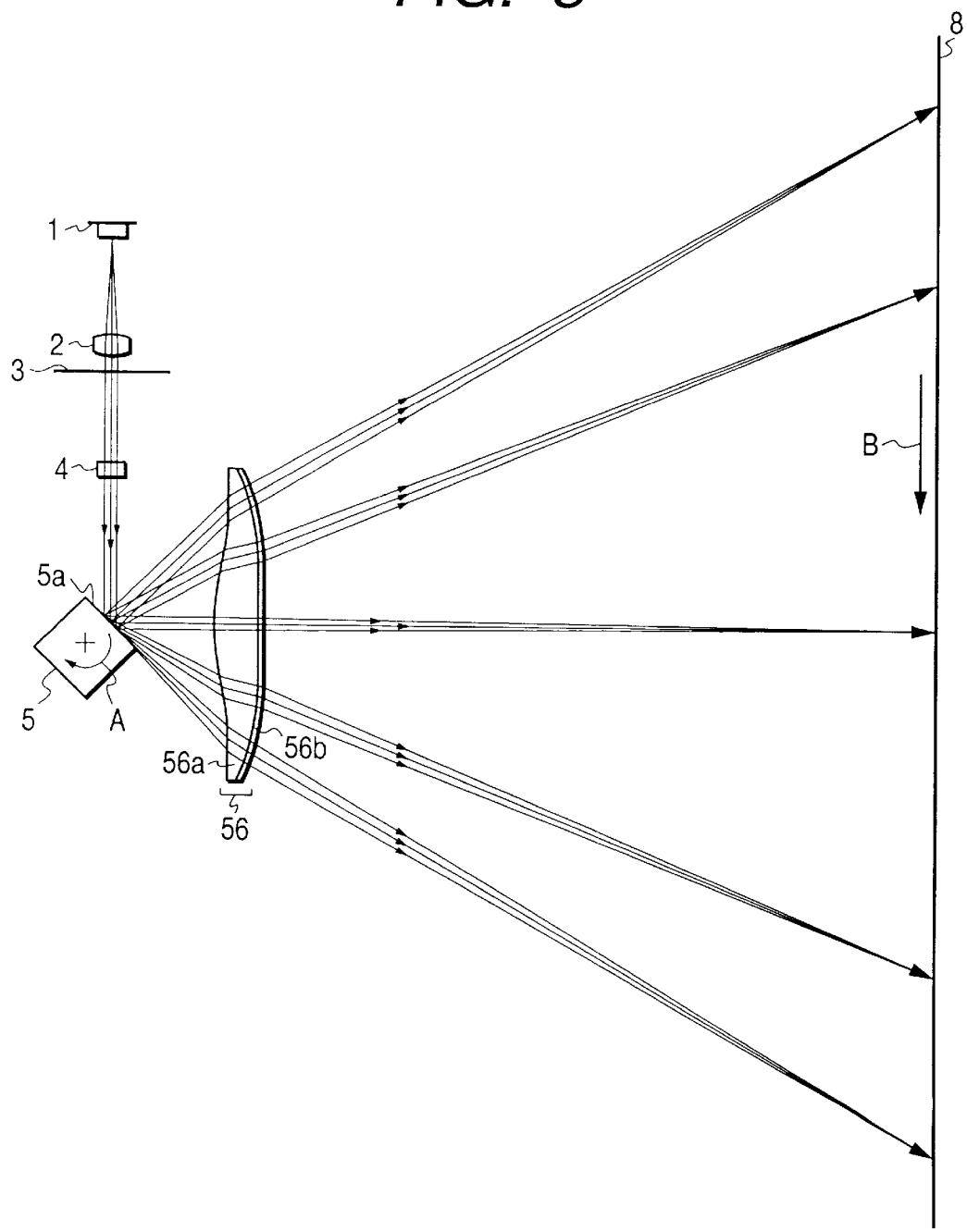
FIG. 8 is a cross-sectional view of the essential portions of Embodiment 3 of the present invention in the main scanning direction.

FIG. 8 is a cross-sectional view (main scanning cross-sectional view) of the essential portions of Embodiment 3 of the present invention in the main scanning direction. In FIG. 8, the same elements as these shown in FIG. 4 are given the same reference numerals.

The differences of the present embodiment from the aforedescribed Embodiment 1 are that the material of the refracting portion (fθ lens) 56a of a scanning optical element 56 is a plastic material of low refractive index as compared with that in Embodiment 1, and that corresponding thereto, the power ratio between the refracting portion 56a and the diffracting portion (diffracting optical element) 56b of the scanning optical element 56 is made to differ. In other respects, the construction and optical action of the present embodiment are substantially similar to those of the aforedescribed Embodiment 1, whereby there is obtained a similar effect.

Table 4 below shows the optical arrangement in the present embodiment and the aspherical surface coefficient of the fθ lens and the phase term of the diffracting optical element (BOE) 56b.

TABLE 4

Design Example of Scanning Optical Apparatus

|  |  |  |  | surface shape of fθ lens | |
|---|---|---|---|---|---|
|  |  |  |  | first surface | second surface |
| wavelength used | λ(nm) | 780 | R | 6.93642e + 01 | 1.98574e + 02 |
| refraction | n | 1.402 | Ks | −1.78054e + 01 | −1.10263e + 02 |

TABLE 4-continued

Design Example of Scanning Optical Apparatus

| index of fθ lens | | | | | |
|---|---|---|---|---|---|
| incident angle in polygon | θi | −90.0 | B4s | −3.26775e − 06 | −3.99337e − 06 |
| max. emergence angle in polygon | θmax | 45.0 | B6s | 1.09375e − 09 | 8.84428e − 10 |
| distance between polygon and fθ lens | e | 27.5 | B8s | −2.70818e − 13 | −1.89126e − 13 |
| center thickness of fθ lens | d | 7.7 | B10s | 4.17533e − 17 | −1.17893e − 17 |
| distance between fθ lens and scanned surface | Sk | 131.3 | Ke | −1.41847e + 01 | −8.99542e + 01 |
| fθ coefficient | f | 136.0 | B4e | −3.60107e − 06 | −3.68241e − 06 |
| polygon | | φ20, 4 surfaces | B6e | 1.39181e − 09 | 6.16817e − 10 |
| In the shape of fθ lens, | | | B8e | −5.07945e − 13 | −1.42807e − 13 |
| suffix s indicates laser side, | | | B10e | 1.29832e − 16 | −6.18184e − 19 | and
suffix e indicates a side opposite to laser side.

BOE Phase term
(wavelength 780 nm)

| | first surface | second surface |
|---|---|---|
| C2 | — | −1.8252E − 03 |
| C4 | — | 4.2016E − 07 |
| C6 | — | −3.7548E − 10 |
| C8 | — | 6.8367E − 14 |

Embodiment 3

Figure 9:
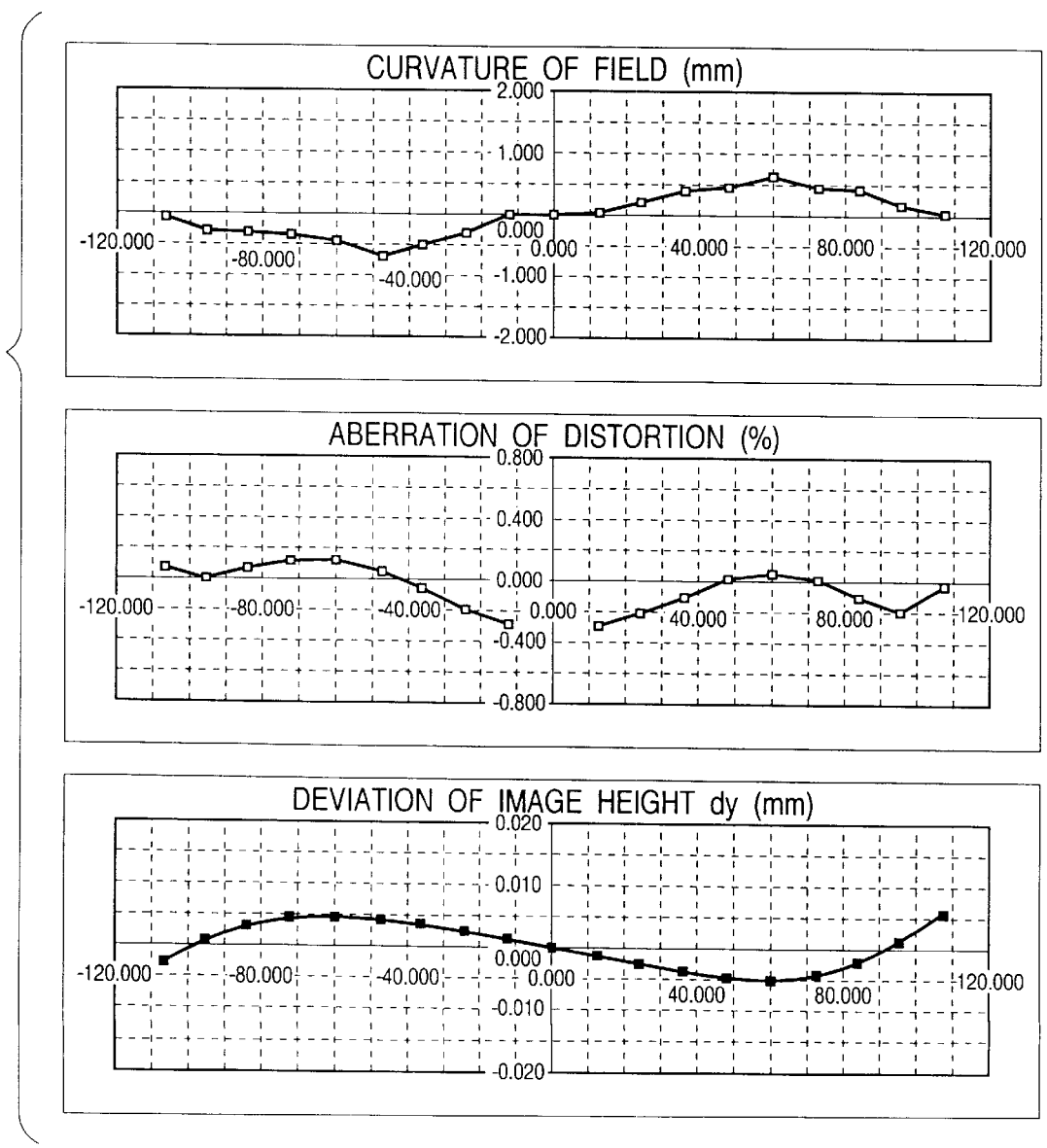
FIG. 9 shows the curvature of the image field, the aberration of distortion, and image height deviation in the main scanning direction before and after temperature rise in Embodiment 3 of the present invention.

In the present embodiment, the power ratio between the refracting portion 56a and the diffracting portion 56b of the scanning optical element 56 is $\phi L/\phi D = 1.052$ to thereby satisfy conditional expression (1). FIG. 9 is an illustration showing the curvature of image field, the aberration of distortion (fθ characteristic) and image height deviation in the main scanning direction before and after a temperature rise in the present embodiment, and the solid lines indicate the characteristics at room temperature (25° C.), and the dotted lines indicate the characteristics when the temperature has risen by 25° C. and reached 50° C. From FIG. 9, it is seen that there is little or no change in focus and magnification in the main scanning direction before and after the temperature rise.

In the present embodiment, even if as described above, the material of the refracting portion (fθ lens) 56a is a material of low refractive index as compared with that in Embodiment 1, the power ratio between the refracting portion 56a and the diffracting portion 56b is set to a suitable value so as to satisfy the aforementioned conditional expression (1), whereby as in Embodiment 1, changes in the magnification and focus in the main scanning direction resulting from the environmental fluctuations (temperature fluctuation and the wavelength fluctuation of the semiconductor laser) of the scanning optical apparatus can be corrected by changes in the power of the refracting portion 56a and the diffracting portion 56b.

Figure 10:
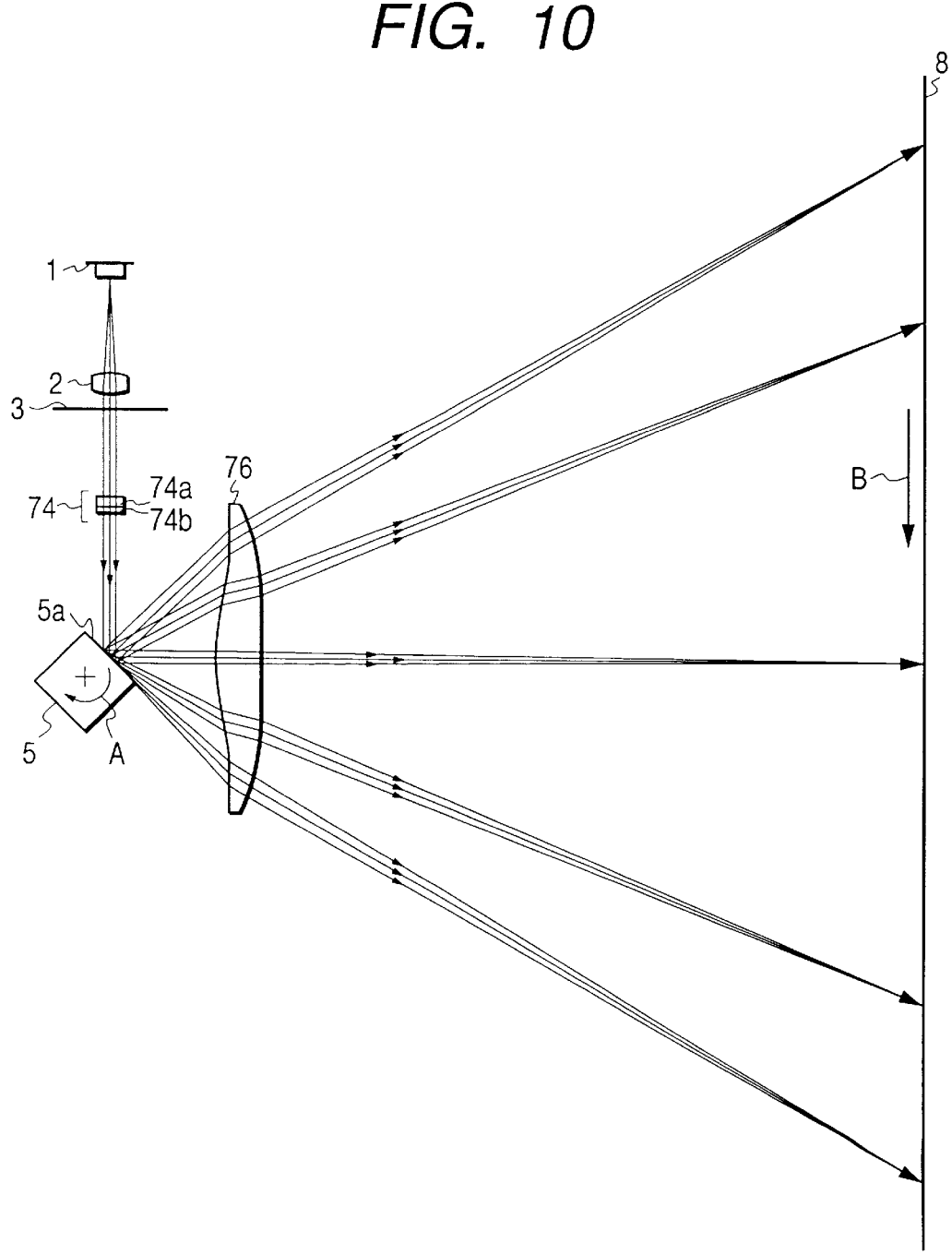
FIG. 10 is a cross-sectional view of the essential portions of Embodiment 4 of the present invention in the main scanning direction.

FIG. 10 is a cross-sectional view (main scanning cross-sectional view) of the essential portions of Embodiment 4 of the present invention in the main scanning direction. In FIG. 10, the same elements as those shown in FIG. 4 are given the same reference numerals.

The difference of the present embodiment from the aforedescribed Embodiment 1 is that a diffracting optical element 74b as the diffracting portion is added to one surface of a cylindrical lens 74a for the correction of surface inclination, instead of an fθ lens. In other respects, the construction and optical action of the present embodiment are substantially similar to those of the aforedescribed Embodiment 1. In such a form wherein the diffracting portion is added to the cylindrical lens, changes in the focus in the main scanning direction can be corrected, but changes in the magnification cannot be corrected. However, the size of the diffracting portion becomes small, and this leads to a reduced cost.

That is, in FIG. 10, reference numeral 74 designates an anamorphic optical element for correction of surface inclination, and this anamorphic optical element 74 has a refracting portion 74a and a diffracting portion 74b. The refracting portion 74a comprises a cylindrical lens (plano-convex lens) having no power in the main scanning direction, and the diffracting portion 74b comprises a diffracting optical element such as a binary optical element comprising the aforedescribed staircase-like diffraction grating or a Fresnel-like optical element comprising a sawtooth-like diffraction grating, and the diffracting optical element 74b is added to that lens surface of the cylindrical lens 74a, which is located the light deflector 5 side. Reference numeral 76 denotes a scanning optical element having the fθ characteristic, and it comprises a single lens (fθ lens) formed of a plastic material, and the both lens surfaces of the single lens 76 in the main scanning direction are formed of an aspherical shape. Also, the single lens 76 differs in refractive power between the main scanning direction and the sub-scanning direction and causes a light beam based on image information deflected by the light deflector 5 to be imaged on the photosensitive drum surface 8, which is the surface to be scanned, and corrects the surface inclination of the deflecting surface of the light deflector 5.

In the present embodiment, a divergent light beam emitted from the semiconductor laser 1 is converted into a substantially parallel light beam by the collimator lens 2, and this light beam (the quantity of light) is limited by the aperture stop 3 and enters the anamorphic optical element 74 comprising the refracting portion (cylindrical lens) 74a and the diffracting portion (diffracting optical element) 74b. The light beam which has entered the anamorphic optical element 74 intactly emerges therefrom in the main scanning direction. Also, in the sub-scanning direction, the light beam converges and is imaged as a substantially linear image (a linear image long in the main scanning direction) on the deflecting surface 5a of the light deflector 5. The light beam deflected by the deflecting surface 5a of the light deflector 5 is directed onto the photosensitive drum surface 8 through the fθ lens 76 differing in refractive power between the main scanning direction and the sub-scanning direction, and the light deflector 5 is rotated in the direction of arrow A, whereby the light beam scans on the photosensitive drum surface 8 in the direction of arrow B. Thereby, image recording is effected on the photosensitive drum surface 8 which is a recording medium.

Table 5 below shows the optical arrangement in the present embodiment, the aspherical surface coefficient of the fθ lens and the phase term of the diffracting optical element (BOE).

Figure 12:
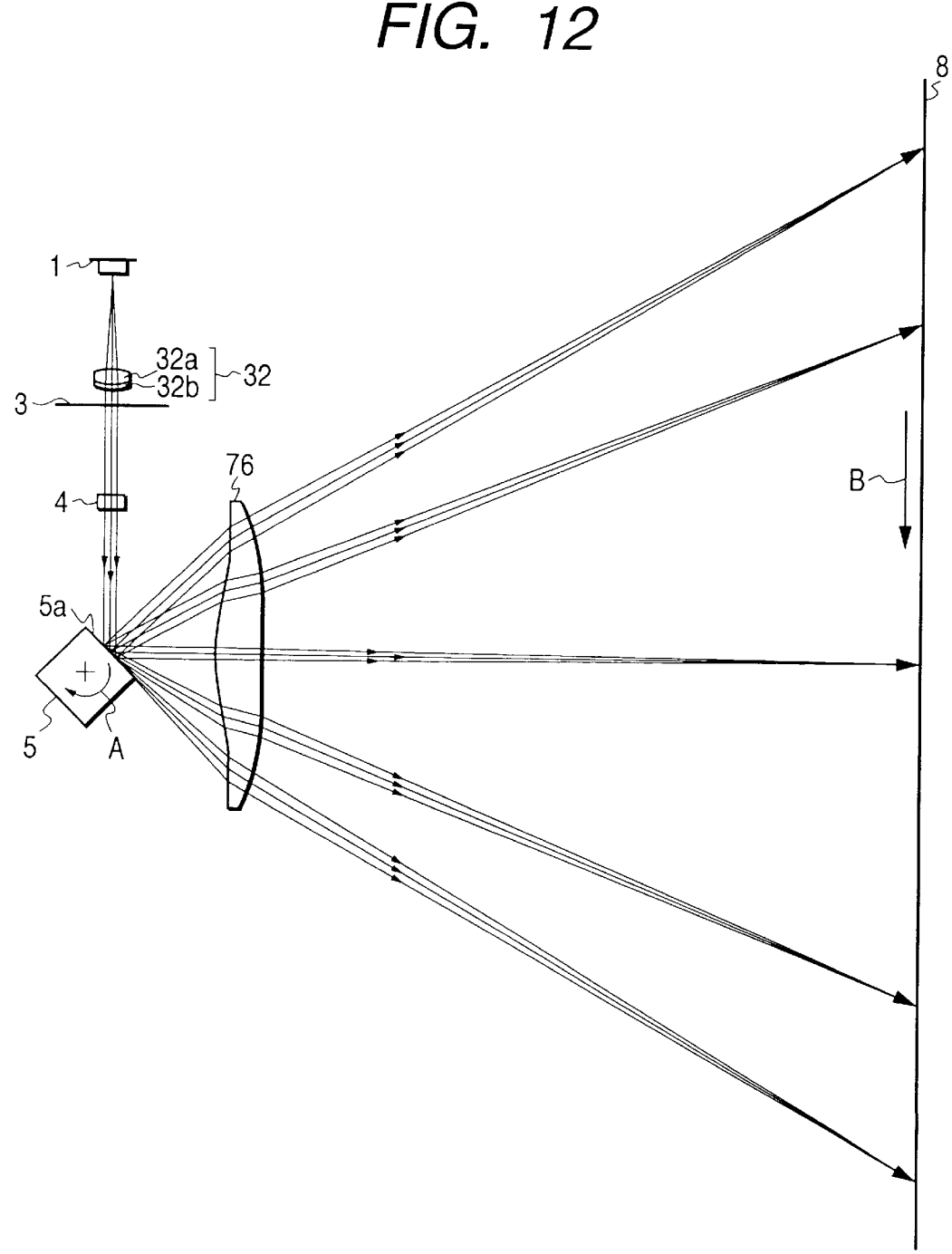
FIG. 12 is a cross-sectional view of the essential portions of Embodiment 5 of the present invention in the main scanning direction.

Embodiment 5 of the present invention will now be described with reference to FIG. 12. The difference of this embodiment from the aforedescribed Embodiment 4 is that a diffracting optical element 32b as the diffracting portion is added to one surface of a collimator lens 32a. In other respects, the construction and optical action of this embodiment are substantially similar to those of the aforedescribed Embodiment 4, whereby there is obtained a similar effect.

That is, in the present embodiment, a converting optical element 32 is comprised of the collimator lens 32a as the refracting portion, and the diffracting optical element 32b as

TABLE 5

Design Example of scanning Optical Apparatus

| | | | | surface shape of fθ lens | |
|---|---|---|---|---|---|
| | | | | first surface | second surface |
| wavelength used | λ(nm) | 780 | R | 5.35941e + 01 | 2.04585e + 02 |
| refractive index of fθ lens | n | 1.525 | Ks | −1.85041e + 01 | −3.19655e + 02 |
| incident angle in polygon | θi | −90.0 | B4s | −4.01467e − 06 | −5.67674e − 06 |
| max. emergence angle in polygon | θmax | 45.0 | B6s | 1.97617e − 10 | 1.13298e − 09 |
| distance between polygon and fθ lens | l | 28.9 | B8s | 3.18251e − 13 | −1.08244e − 12 |
| distance between cylinder and polygon | e | 21.3 | B10s | −4.34340e − 17 | 3.75204e − 17 |
| center thickness of fθ lens | d | 8.0 | Ke | −1.85041e + 01 | −3.19655e + 02 |
| distance between fθ lens and scanned surface | Sk | 128.2 | B4e | −6.38051e − 06 | −7.32456e − 06 |
| fθ coefficient | f | 136.0 | B6e | −5.04862e − 10 | 4.21805e − 10 |
| polygon | | φ20, 4 surfaces | B8e | 2.89411e − 13 | −1.75629e − 12 |
| In the shape of fθ lens, suffix s indicates laser side, and | | | B10e | 1.05151e − 15 | 5.30015e − 17 |
| | | | | BOE Phase term (wavelength 780 nm) | |
| suffix e indicates a side opposite to laser side. | | | | cylinder second surfaces | |
| | | | C2 | −2.6857E − 03 | — |
| | | | C4 | — | — |
| | | | C6 | — | — |
| | | | C8 | — | — |

Embodiment 4

Figure 11:
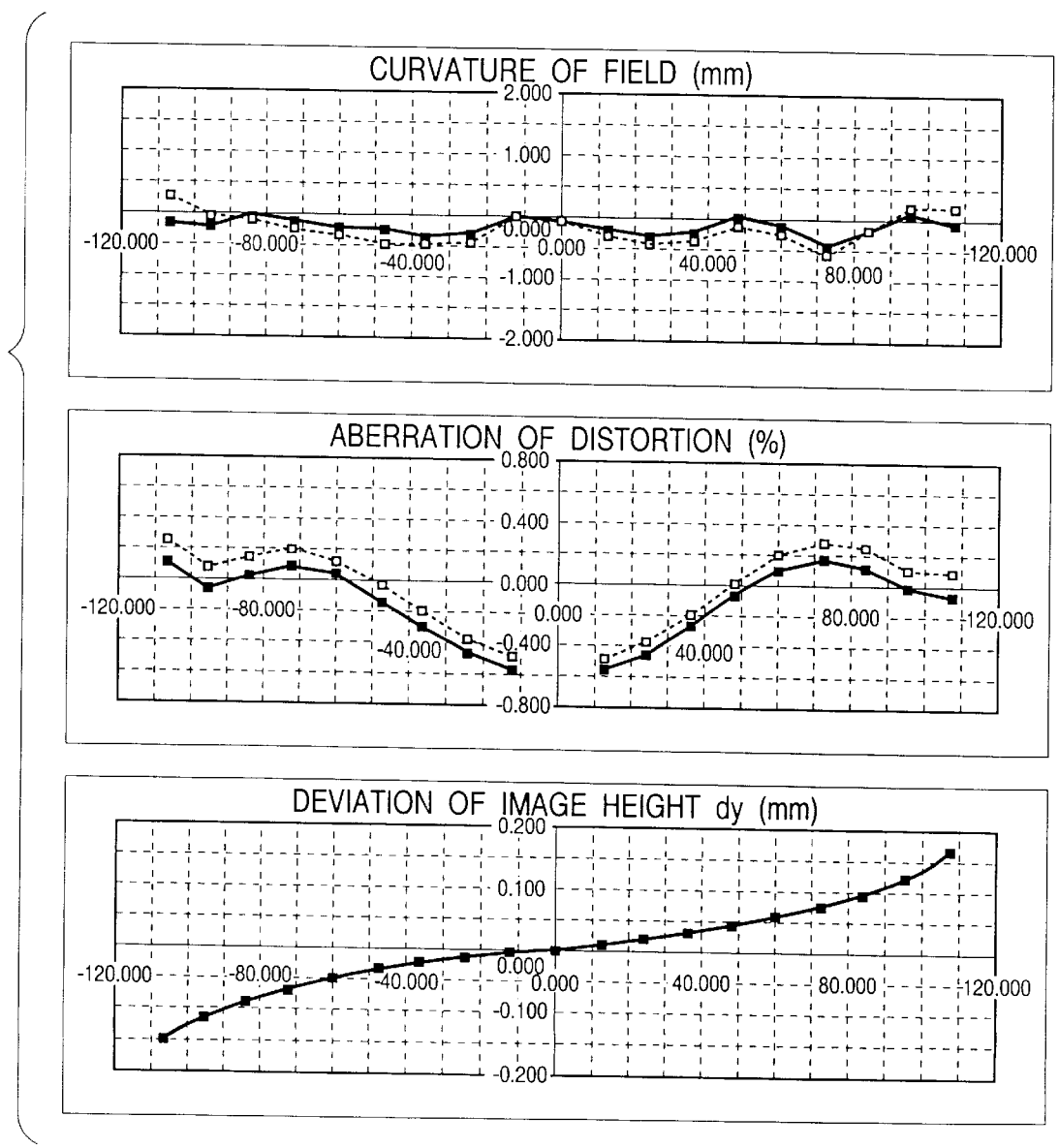
FIG. 11 shows the curvature of the image field, the aberration of distortion, and image height deviation in the main scanning direction before and a after temperature rise in embodiment 4 of the present invention.

FIG. 11 is an illustration showing the curvature of the image field, the aberration of distortion, and image height deviation in the main scanning direction before and after a temperature rise in the present embodiment, and the solid lines indicate the characteristics at room temperature (25° C.) and the dotted lines indicate the characteristics when a temperature has risen by 25° C. and reached 50° C. It is seen from FIG. 11 that there is little or no change in the focus in the main scanning direction before and after the temperature rise.

In the present embodiment, as described above, the diffracting optical element 74b as the diffracting portion is added to one surface of the cylindrical lens 74a, whereby changes in the focus in the main scanning direction resulting from the environmental fluctuations (temperature fluctuation and the wavelength fluctuation of the semiconductor laser) of the scanning optical apparatus are corrected by changes in the power of the diffracting portion 74b and the fθ lens 76 as the refracting portion. Also, in the present embodiment, the diffracting optical element is added to one surface of not the fθ lens (scanning optical element) but the cylindrical lens, whereby the effect can be realized by an easier construction as compared with the aforedescribed Embodiments 1 to 3.

the diffracting portion, and the diffracting optical element is added to one of the both lens surfaces of the collimator lens, whereby as in the aforedescribed Embodiment 4, changes in the focus in the main scanning direction resulting from the environmental fluctuations (temperature fluctuation and the wavelength fluctuation of the semiconductor laser) of the scanning optical apparatus are corrected by changes in the power of the diffracting portion 32b and the fθ lens 76 as the refracting portion.

While in each embodiment, the diffracting optical element is added to one surface of one of a plurality of optical elements constituting an optical system, this is not restrictive, but and the present invention can obtain an effect similar to that of each of the above-described embodiments even if the diffracting optical element is independently disposed in the optical path.

According to the present invention, there can be achieved a scanning optical apparatus in which as previously described, changes in the focus in the main scanning direction, resulting from environmental fluctuations, of the scanning optical apparatus are corrected by a characteristic of the optical means having a refracting portion and a diffracting portion, which resists environmental fluctuations (temperature fluctuation and the wavelength fluctuation of a semiconductor laser which is light source means) and moreover is suitable for highly minute printing and is compact.

Also, according to the present invention, there can be achieved a scanning optical apparatus in which as previously described, changes in the focus and magnification in the main scanning direction, resulting from the environmental fluctuations, of the scanning optical apparatus are corrected by the a characteristic of a scanning optical element having a refracting portion and a diffracting portion, which resists environmental fluctuations (temperature fluctuation and the wavelength fluctuation of a semiconductor laser which is light source means) and moreover is suitable for highly minute printing and is compact.

What is claimed is:

1. A scanning optical apparatus comprising:
   a semiconductor laser;
   a deflecting element for deflecting a light beam emitted from said semiconductor laser; and
   a scanning optical system for directing the light beam deflected by said deflecting element onto a surface to be scanned, said scanning optical system including a refracting portion and a diffracting portion,
   wherein the following condition is satisfied:

$$1.0 \leq \phi L/\phi D \leq 2.6$$

where $\phi L$ represents the power of the refracting portion of said scanning optical system and $\phi D$ represents the power of the diffracting portion of said scanning optical system.

2. The scanning optical apparatus according to claim 1, further comprising an anamorphic optical system for causing the light beam emitted from said semiconductor laser to be imaged in a linear shape elongated in a main scanning direction on a deflecting surface of said deflecting element.

3. The scanning optical apparatus according to claim 2, wherein said anamorphic optical system comprises a collimator lens for converting the light beam emitted from said semiconductor laser into a parallel beam and a cylindrical lens for linearly condensing the parallel beam.

4. The scanning optical apparatus according to claim 1, wherein said deflecting element comprises a polygon mirror.

5. The scanning optical apparatus according to claim 1, wherein said scanning optical system comprises a single lens, and a diffracting optical element is provided on at least one of a light incident surface and a light emergent surface of said single lens.

6. The scanning optical apparatus according to claim 5, wherein said single lens is composed of a plastic material.

7. The scanning optical apparatus according to claim 5, wherein said light incident surface and said light emergent surface of said single lens each respectively comprises an aspherical-shaped lens surface in a main scanning direction.

8. The scanning optical apparatus according to claim 5, wherein said single lens has a refractive power that differs between a main scanning direction and a sub-scanning direction.

9. The scanning optical apparatus according to claim 5, wherein said diffracting optical element comprises a binary optical element comprising a staircase-like diffraction grating.

10. The scanning optical apparatus according to claim 5, wherein said diffracting optical element comprises a Fresnel optical element comprising a sawtooth-like diffraction grating.

11. The scanning optical apparatus according to claim 1, wherein the power ratio between the refracting portion and the diffracting portion of said scanning optical system satisfies said condition within an on-axis to off-axis range.

12. A scanning optical apparatus comprising:
    a semiconductor laser;
    a deflecting element for deflecting a light beam emitted from said semiconductor laser; and
    a scanning optical system for directing the light beam deflected by said deflecting element onto a surface to be scanned, said scanning optical system including a refracting portion and a diffracting portion,
    wherein said scanning optical system comprises a single lens, and a diffracting optical element is provided on at least one of a light incident surface and a light emergent surface of said single lens, and a change in the focus in a main scanning direction, resulting from environmental fluctuations, of said scanning optical apparatus is corrected by a characteristic of said scanning optical system.

13. The scanning optical apparatus according to claim 12, wherein the environmental fluctuation includes a wavelength fluctuation of said semiconductor laser and a change of the refractive index due to a temperature fluctuation.

14. The scanning optical apparatus according to claim 12, wherein said single lens is composed of a plastic material.

15. The scanning optical apparatus according to claim 12, wherein the light incident surface and the light emergent surface of said single lens each respectively comprises an aspherical-shaped lens surface in the main scanning direction.

16. The scanning optical apparatus according to claim 12, wherein said diffracting optical element comprises a binary optical element comprising a staircase-like diffraction grating.

17. The scanning apparatus according to claim 12, wherein said diffracting optical element comprises a Fresnel optical element comprising a sawtooth-like diffraction grating.

18. The scanning optical apparatus according to claim 12, further comprising an anamorphic optical system for causing the light beam emitted from said semiconductor laser to be imaged in a linear shape elongated in the main scanning direction on a deflecting surface of said deflecting element.

19. The scanning optical apparatus according to claim 18, wherein said anamorphic optical system comprises a collimator lens for converting the light beam emitted from said semiconductor laser into a parallel beam and a cylindrical lens for linearly condensing the parallel beam.

20. The scanning optical apparatus according to claim 12, wherein said deflecting element comprises a polygon mirror.

21. A scanning optical apparatus comprising:
    a semiconductor laser;
    a deflecting element for deflecting a light beam emitted from said semiconductor laser; and
    an anamorphic optical system for causing the light beam emitted from said semiconductor laser to be imaged in a linear shape elongated in a main scanning direction on a deflecting surface of said deflecting element, said anamorphic optical system having a diffracting portion; and
    a scanning optical system for directing the light beam deflected by said deflecting element onto a surface to be scanned,
    wherein said scanning optical system comprises a single lens which is composed of a plastic material, and a change in focus in the main scanning direction, resulting from environmental fluctuation, of said scanning optical apparatus is corrected by characteristics of said anamorphic optical system and said scanning optical system.

22. The scanning optical apparatus according to claim 21, wherein said anamorphic optical system comprises a collimator lens for converting the light beam emitted from said semiconductor laser into a parallel beam and a cylindrical lens for linearly condensing the parallel beam, and a diffracting optical element is provided on at least one of a light incident surface and a light emergent surface of said cylindrical lens.

23. The scanning optical apparatus according to claim 21, wherein the environmental fluctuation includes a wavelength fluctuation of said semiconductor laser and a change of the refractive index due to a temperature fluctuation.

24. The scanning optical apparatus according to claim 21, wherein an incident surface and an emergent surface of said single lens each respectively comprises an aspherical-shaped lens surface in the main scanning direction.

25. The scanning optical apparatus according to claim 21, wherein said single lens has a refractive power that differs between the main scanning direction and a sub-scanning direction.

26. The scanning optical apparatus according to claim 21, wherein said diffracting portion comprises a binary optical element comprising a staircase-like diffraction grating provided on said anamorphic optical system.

27. The scanning optical apparatus according to claim 21, wherein said diffracting portion comprises a Fresnel optical element comprising a sawtooth-like diffraction grating provided on said anamorphic optical system.

28. The scanning optical apparatus according to claim 21, wherein said deflecting element comprises a polygon mirror.

29. A scanning optical apparatus comprising:
   a semiconductor laser;
   a collimator lens for converting a light beam emitted from said semiconductor laser into a parallel beam, said collimator lens having a diffracting portion;
   a deflecting optical element for deflecting the light beam transmitted through said collimator lens; and
   a scanning optical system for directing the light beam deflected by said deflecting element onto a surface to be scanned, said scanning optical system having a refracting portion,
   wherein a change in focus in a main scanning direction, resulting from environmental fluctuation, of said scanning optical apparatus is corrected by characteristics of said collimator lens and said scanning optical system.

30. The scanning optical apparatus according to claim 29, further comprising a cylindrical lens for causing the parallel beam transmitted through said collimator lens to be condensed in a linear shape elongated in the main scanning direction on a deflecting surface of said deflecting element.

31. The scanning optical apparatus according to claim 29, wherein the environmental fluctuation includes a wavelength fluctuation of said semiconductor laser and a change of the reflective index due to a temperature fluctuation.

32. The scanning optical apparatus according to claim 29, wherein said deflecting element comprises a polygon mirror.

33. The scanning optical apparatus according to claim 29, wherein said scanning optical system comprises a single lens which is composed of a plastic material.

34. The scanning optical apparatus according to claim 33, wherein a light incident surface and a light emergent surface of said single lens each respectively comprises an aspherical-shaped lens surface in the main scanning direction.

35. The scanning optical apparatus according to claim 33, wherein said single lens has a refractive power that differs between the main scanning direction and the sub-scanning direction.

36. The scanning optical apparatus according to claim 29, wherein said diffracting optical element comprises a binary optical element comprising a staircase-like diffraction grating provided on said collimator lens.

37. The scanning optical apparatus according to claim 29, wherein said diffracting optical element comprises a Fresnel optical element comprising a sawtooth-like diffraction grating provided on said collimator lens.

38. A laser beam printer comprising:
   the scanning optical apparatus according to any one of claims 1 to 37; and
   a recording medium provided on the surface to be scanned of said scanning optical apparatus.

39. The laser beam printer according to claim 38, wherein said recording medium comprises a photosensitive drum.

* * * * *

UNITED STATES PATENT AND TRADEMARK OFFICE
CERTIFICATE OF CORRECTION

PATENT NO. : 6,094,286

DATED : July 25, 2000

INVENTOR(S): MANABU KATO

Page 1 of 3

It is certified that error appears in the above-identified patent and that said Letters Patent is hereby corrected as shown below:

COLUMN 1
    Line 30, "and" should read --and improvement in--.

COLUMN 2
    Line 2, "term main" should read --term "main--.
    Line 3, "cross-section refers" should read --cross-section" refers--.
    Line 6, "sub-scanning cross-section refers" should read --"sub-scanning cross-section" refers--.

COLUMN 4
    Line 36, "at least one of the" should read --at least one of--.

COLUMN 5
    Line 9, "the both" should read --both--.
    Line 12, "the both" should read --both--.
    Line 44, "the both" should read --both--.
    Line 47, "the both" should read --both--.

UNITED STATES PATENT AND TRADEMARK OFFICE
CERTIFICATE OF CORRECTION

PATENT NO. : 6,094,286
DATED       : July 25, 2000
INVENTOR(S): MANABU KATO

Page 2 of 3

It is certified that error appears in the above-identified patent and that said Letters Patent is hereby corrected as shown below:

COLUMN 6
    Line 2, "is" should read --in--.
    Line 4, "image field," should read --the image field,--.
    Line 21, "after" should read --after a--.
    Line 28, "a after" should read --after a--.

COLUMN 13
    Line 32, "curvature of image field" should read --curvature of the image field--.
    Line 33, "characteristic)" should read --characteristic),--.

COLUMN 14
    Line 41, "the" should read --on the--.

UNITED STATES PATENT AND TRADEMARK OFFICE
CERTIFICATE OF CORRECTION

PATENT NO. : 6,094,286
DATED : July 25, 2000
INVENTOR(S): MANABU KATO

It is certified that error appears in the above-identified patent and that said Letters Patent is hereby corrected as shown below:

COLUMN 16
  Line 44, "both" should read --two--.
  Line 54, "but and" should read --and--.

Signed and Sealed this

Seventeenth Day of April, 2001

NICHOLAS P. GODICI

Attesting Officer    Acting Director of the United States Patent and Trademark Office